(12) United States Patent
Sun et al.

(10) Patent No.: US 11,394,504 B2
(45) Date of Patent: Jul. 19, 2022

(54) METHOD AND APPARATUS FOR UPLINK TRANSMISSION

(71) Applicant: Nokia Technologies Oy, Espoo (FI)

(72) Inventors: Jingyuan Sun, Beijing (CN); Yuantao Zhang, Beijing (CN); Zhuyan Zhao, Beijing (CN); Hong Zhou, Beijing (CN)

(73) Assignee: NOKIA TECHNOLOGIES OY, Espoo (FI)

(*) Notice: Subject to any disclaimer, the term of this patent is extended or adjusted under 35 U.S.C. 154(b) by 0 days.

(21) Appl. No.: 16/642,234

(22) PCT Filed: Sep. 11, 2017

(86) PCT No.: PCT/CN2017/101283
§ 371 (c)(1),
(2) Date: Feb. 26, 2020

(87) PCT Pub. No.: WO2019/047232
PCT Pub. Date: Mar. 14, 2019

(65) Prior Publication Data
US 2020/0186306 A1 Jun. 11, 2020

(51) Int. Cl.
*H04L 5/00* (2006.01)
*H04W 72/04* (2009.01)

(52) U.S. Cl.
CPC ........... *H04L 5/0044* (2013.01); *H04W 72/04* (2013.01)

(58) Field of Classification Search
CPC ....... H04L 5/0044; H04L 1/08; H04L 1/1819; H04L 1/189; H04L 1/0041; H04W 72/04
See application file for complete search history.

(56) References Cited

U.S. PATENT DOCUMENTS

| | | | |
|---|---|---|---|
| 8,498,274 B2 | 7/2013 | Ahn et al. | |
| 2009/0086849 A1* | 4/2009 | Tsai | ........................ H04L 1/005 375/298 |

(Continued)

FOREIGN PATENT DOCUMENTS

| | | |
|---|---|---|
| CN | 106712910 A | 5/2017 |
| WO | 2009/057922 A1 | 5/2009 |

(Continued)

OTHER PUBLICATIONS

"Rate Matching for LDPC Codes", 3GPP TSG-RAN WG1 meeting #89, R1-1706973, Agenda: 7.1.4.1.1.3, Huawei, May 15-19, 2017, 4 pages.

(Continued)

*Primary Examiner* — Ajit Patel
*Assistant Examiner* — Wilfred Thomas
(74) *Attorney, Agent, or Firm* — Squire Patton Boggs (US) LLP

(57) ABSTRACT

Embodiments of the present disclosure relate to methods and apparatuses for uplink transmission without an uplink grant. In example embodiments, a method implemented in a terminal device in a communication system is presented. According to this method, the terminal device determines a redundancy version (RV) pattern for a plurality of uplink transmissions. The RV pattern indicates a plurality of RV indices. At least one RV index in the respective plurality of RV indices is periodic in the RV pattern. The terminal device determines coded bits to be transmitted in the plurality of uplink transmissions based at least in part on the RV pattern. The terminal device transmits the coded bits to the network device in at least one transmission of the plurality of uplink transmissions without an uplink grant. By utilizing this periodic structure of the RV pattern, the network device may have more chance to receive the predefined or configured (Continued)

RV index with self-decodable transmissions for example, leading to a higher reliability and better decoding performance for the grant-free communication systems.

20 Claims, 7 Drawing Sheets

(56) References Cited

U.S. PATENT DOCUMENTS

| | | | |
|---|---|---|---|
| 2009/0125774 A1* | 5/2009 | Kim | H04L 1/189 714/748 |
| 2010/0195614 A1 | 8/2010 | Nimbalker et al. | |
| 2011/0103327 A1* | 5/2011 | Lee | H04W 48/12 370/329 |
| 2011/0223924 A1* | 9/2011 | Lohr | H04L 1/1607 455/450 |
| 2012/0243496 A1 | 9/2012 | Zhu et al. | |
| 2013/0223485 A1* | 8/2013 | Bai | H04L 1/1819 375/219 |
| 2014/0098761 A1 | 4/2014 | Lee et al. | |
| 2015/0349924 A1 | 12/2015 | Wang et al. | |
| 2017/0222749 A1 | 8/2017 | Dinan | |
| 2017/0288817 A1* | 10/2017 | Cao | H04L 1/1819 |
| 2018/0375616 A1* | 12/2018 | Beale | H04L 1/1816 |
| 2019/0215907 A1* | 7/2019 | Phuyal | H04L 1/1864 |
| 2019/0268903 A1* | 8/2019 | Lee | H04W 72/0446 |
| 2019/0363833 A1* | 11/2019 | Wang | H04L 1/189 |
| 2020/0213980 A1* | 7/2020 | Takeda | H04L 1/1812 |
| 2020/0244406 A1* | 7/2020 | Lee | H04L 5/001 |
| 2020/0295884 A1* | 9/2020 | Bergstrom | H04L 1/1816 |
| 2020/0314840 A1* | 10/2020 | Golitschek Edler Von Elbwart | H04L 5/0044 |

FOREIGN PATENT DOCUMENTS

| | | |
|---|---|---|
| WO | 2009/132204 A2 | 10/2009 |
| WO | 2016/013781 A1 | 1/2016 |
| WO | 2016/106648 A1 | 7/2016 |
| WO | 2016/126330 A1 | 8/2016 |
| WO | 2016/167828 A1 | 10/2016 |
| WO | 2017/039564 A1 | 3/2017 |

OTHER PUBLICATIONS

"LTE; Evolved Universal Terrestrial Radio Access (E-UTRA); Physical Layer Procedures (3GPP TS 36.213 Version 12.7.0 Release 12)", ETSI TS 136 213, V12.7.0, Oct. 2015, 243 pages.

"Rate Matching for LDPC Codes", 3GPP TSG-RAN WG1 NR Ad-Hoc#2, R1-1711438, Agenda: 5.1.4.1.1.3, Huawei, Jun. 27-30, 2017, 6 pages.

International Search Report and Written Opinion received for corresponding Patent Cooperation Treaty Application No. PCT/CN2017/101283, dated May 31, 2018, 11 pages.

"HS-SCCH RV Signalling for MIMO", 3GPP TSG-RAN WG1 meeting #48, R1-070830, Agenda: 7.1 MIMO in UTRA (Rel'7 work item), Siemens, Feb. 12-16, 2007, 9 pages.

Extended European Search Report received for corresponding European Patent Application No. 17924351.4, dated Mar. 26, 2021, 12 pages.

"HARQ Process for UL Grant-free Transmission", 3GPP TSG-RAN WG2 Meeting#99, R2-1708487, Agenda : 10.3.1.8, vivo, Aug. 21-25, 2017, 4 pages.

"UL Data Transmission with and without SR/UL Grant", 3GPP TSG WGI NRAd Hoc Meeting, R1-1715419, Agenda : 6.3.3.4, Huawei, Sep. 18-21, 2017, 13 pages.

"UL grant-free Transmission for URLLC", 3GPP TSG RAN WG1 NR Ad-Hoc#2, R1-1710601, Agenda : 5.1.3.3.3, Lenovo, Jun. 27-30, 2017, 3 pages.

"RV Selection for Uplink HARQ", 3GPP TSG RAN WG1 #52, R1-081009, Agenda : 6.2, LG Electronics, Feb. 11-15, 2008, 4 pages.

First Chinese Office Action issued in corresponding Chinese Patent Application No. 201780094770.9 dated Dec. 16, 2021, with English summary thereof.

LG Electronics, "Summary of [89-22] Email discussion about UL data transmission without UL grant", 3GPP TSG RAN WG1 Ad-Hoc#2, R1-1710328, Jun. 27, 2017.

* cited by examiner

METHOD AND APPARATUS FOR UPLINK TRANSMISSION

RELATED APPLICATION

This application was originally filed as PCT Application No. PCT/CN2017/101283 filed Sep. 11, 2017.

TECHNICAL FIELD

Embodiments of the present disclosure generally relate to the field of communications, and in particular, to methods and apparatuses for uplink transmission and reception without an uplink transmission grant.

BACKGROUND

In the Third Generation Partnership Project (3GPP) Long Term Evolution (LTE) communication systems, the uplink transmission of User Equipment (UE) is based on the uplink scheduling from the Base Station (BS). There are two types of uplink scheduling in the conventional LTE communication systems, i.e., the persistent scheduling and non-persistent scheduling.

Generally, if the UE has some traffic data in an uplink buffer to be transmitted, it will send a Scheduling Request (SR) in predefined or configured uplink resources to the BS on Physical Uplink Control Channel (PUCCH). The BS may allocate the uplink transmission resource for the UE according to the Buffer State Report (BSR) of the UE and may send to the UE an uplink grant, i.e., Downlink Control Information (DCI) 0 on the Physical Downlink Control Channel (PDCCH). Then, the UE may decode the DCI 0 from the BS by checking whether there is any DCI 0 information that has Cyclic Redundancy Check (CRC) value encoded with the UE's Cell Radio Network Temporary Identifier (C-RNTI).

If there is DCI 0 allocated for the UE, the UE may transmit the traffic data on Physical Uplink Shared Channel (PUSCH) based on the uplink transmission resource indicated by the DCI 0. Then, the BS may decode the data on PUSCH to obtain the traffic from the UE. Therefore, in the uplink scheduling transmission, there may be a number of signaling exchanges between the UE and BS, which may cause some latency, especially for some specific applications, such as the emergency calling and real time monitoring application.

SUMMARY

In general, example embodiments of the present disclosure provide methods and devices for the uplink transmission and reception without an uplink grant.

In a first aspect, there is provided a method implemented in a terminal device. According to the method, the terminal device performs a plurality of uplink transmissions with a network device without an uplink grant. A Redundancy Version (RV) pattern is determined for the plurality of uplink transmissions. The RV pattern indicates a respective plurality of RV indices. At least one RV index in the respective plurality of RV indices is periodic in the RV pattern. Coded bits to be transmitted in the plurality of uplink transmissions are determined based at least in part on the RV pattern. The coded bits are transmitted without an uplink grant to the network device in at least one transmission of the plurality of uplink transmissions.

In a second aspect, there is provided a method implemented in a terminal device. According to the method, the terminal device performs a plurality of uplink transmission with a network device, without an uplink grant. An RV pattern is determined for the plurality of uplink transmissions. The RV pattern indicates a respective plurality of RV indices. The RV pattern comprises a plurality of RV index subsets. Each RV index subset indicates one or more RV indices. The terminal device determines coded bits to be transmitted in the plurality of uplink transmissions based at least in part on the RV pattern. The coded bits are transmitted to the network device in the plurality of uplink transmissions without an uplink grant.

In a third aspect, there is provided a method implemented in a terminal device. According to the method, the terminal device performs a plurality of uplink transmission with a network device without an uplink grant. For at least one transmission of the plurality uplink transmissions, at least one portion of coded bits to be transmitted is determined in the at least one transmission. The at least one portion of coded bits is transmitted, without an uplink grant, to the network device. A portion of coded bits to be transmitted for each of the at least one transmission starts immediately after an ending position of a previous portion of coded bits to be transmitted in a previous transmission with respect to the each of the at least one transmission.

In a forth aspect, there is provided a method implemented in a network device in a communication system. According to the method, the network device performs a plurality of uplink receptions from a terminal device. An RV pattern is determined for the plurality of uplink receptions. The RV pattern indicates a plurality of RV indices, and at least one RV index in the plurality of RV indices is periodic in the RV pattern. The coded bits from the terminal device are received based at least in part on the RV pattern in at least one reception of the plurality of uplink receptions without an uplink grant.

In a fifth aspect, there is provided a method implemented in a network device in a communication system. In the method, the network device performs a plurality of uplink receptions from a terminal device. An RV pattern is determined for the plurality of uplink receptions. The RV pattern indicates a respective plurality of RV indices. The RV pattern comprises a plurality of RV index subsets. Each RV index subset indicates one or more RV indices. Based at least in part on the RV pattern, the coded bits from the terminal device are received in at least one reception of the plurality of uplink receptions without an uplink grant.

In a sixth aspect, there is provided a method implemented in a network device in a communication system. In the method, the network device performed a plurality of uplink receptions from a terminal device. For at least one reception of the plurality of uplink receptions, at least one portion coded bits from the terminal device is received in respective at least one transmission of a respective plurality of uplink transmissions without an uplink grant. A portion of coded bits in each of at least one transmission starts immediately after an ending position of a previous portion of coded bits in a previous transmission with respect to the each of the least one transmission.

In a seventh aspect, there is provided a terminal device. The terminal device comprises a processor and a memory coupled to the processor. The memory stores instructions that when executed by the processor, cause the communication device to performs actions according to any one of the first, the second and the third aspects.

In an eighth aspect, there is provided a network device. The network device comprises a processor and a memory coupled to the processor. The memory stores instructions that when executed by the processor, cause the communication device to performs actions according to any one of the fourth, the fifth and the sixth aspects.

In a ninth aspect, there is provided a computer readable medium having instructions stored thereon. The instructions, when executed on at least one processor, cause the at least one processor to carry out the method according to any one of the first, the second and the third aspects.

In a tenth aspect, there is provided a computer readable medium having instructions stored thereon. The instructions, when executed on at least one processor, cause the at least one processor to carry out the method according to any one of the fourth, the fifth and the sixth aspects.

In an eleventh aspect, there is provided a computer program product that is tangibly stored on a computer readable storage medium. The computer program product includes instructions which, when executed on at least one processor, cause the at least one processor to carry out the method according to any one of the first, the second and the third aspects.

In a twelfth aspect, there is provided a computer program product that is tangibly stored on a computer readable storage medium. The computer program product includes instructions which, when executed on at least one processor, cause the at least one processor to carry out the method according to any one of the fourth, the fifth and the sixth aspects.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
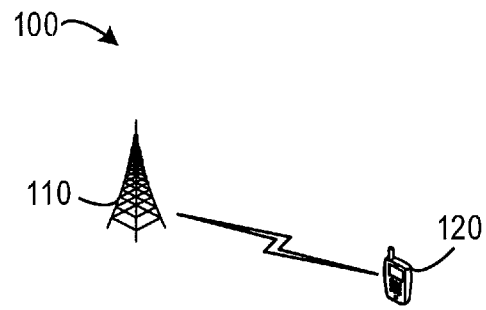
FIG. 1 is a schematic diagram 100 of a communication environment in which the uplink transmission can be implemented.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" or "BS" refers to a device which is capable of providing or hosting a cell or coverage where terminal devices can communicate. Examples of a network device include, but are not limited to, a Node B (NodeB or NB), an Evolved NodeB (eNodeB or eNB), a next generation NodeB (gNB), a Transmission Reception Point (TRP), a Remote Radio Unit (RRU), a radio head (RH), a remote radio head (RRH), and a low power node such as a femto node and a pico node. For the purpose of discussion, in the following description, some embodiments will be described using TRP as examples of the network device.

As used herein, the term "terminal device" refers to any device having wireless or wired communication capabilities. Examples of the terminal device include, but are not limited to, UE, personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like. For the purpose of discussion, in the following, some embodiments will be described with reference to UE as examples of the terminal device.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "at least in part based on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

Communication discussed in the present disclosure may conform to any suitable standards including, but not being limited to, New Radio Access (NR), Long Term Evolution (LTE), LTE-Evolution, LTE-Advanced (LTE-A), Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but are not limited to, the first generation (1G), the second generation (2G), 2.5G, 2.75G, the third generation (3G), the fourth generation (4G), 4.5G, the fifth generation (5G) communication protocols.

FIG. 1 is a schematic diagram 100 of a communication environment in which the uplink transmission can be implemented. The network 100 includes a network device 110 and a terminal device 120 served by the network device 110. The serving area of the network device 110 is referred to as a cell. It is to be understood that the number of network devices and terminal devices is only for the purpose of illustration without introducing any limitations. The network 100 may include any suitable number of network devices and terminal devices adapted for implementing implementations of the present disclosure. Although not shown, it would be appreciated that more terminal devices may be located in the cell and served by the network device 110.

The terminal device 120 may have some data to be transmitted to the network device 110. In conventional scheduling based uplink transmission, the terminal device may send an SR to indicate that the UE has data to be transmitted to the network device 110. Upon receiving the SR from the terminal device 120, the network device 110 determines the uplink resource for the terminal device according to the size of the data and sends an uplink grant to the terminal device. Then, the terminal device 120 may transmit the data to the network device according to the uplink grant. Therefore, in the conventional scheduling based uplink transmission, a number of signaling is required to initiate an uplink transmission, which results in the latency problems especially for the delay-sensitive applications in the New Radio (NR) communication systems. Accordingly, a grant-free uplink transmission is desirable to address this problem, in which the terminal device 120 may communicate with the network device 110 in a number of uplink transmissions without an uplink grant. As for the grant-free uplink transmission, the network device 110 may miss some of the uplink transmissions, which is detrimental to a high reliability and good performance for the uplink transmissions.

In order to solve the above problems and one or more other potential ones. A new type of uplink transmission method without an uplink grant is presented in this disclosure, for example, in the NR communication systems. In this type of uplink transmission, the terminal device 120 may transmit its data to the network device 110 without an uplink grant. In order to achieve a better transmission quality, there may be a plurality of transmissions and reception for the data without an uplink grant. Moreover, the configuration information for the uplink transmission may be informed or preconfigured from the network device 110 to the terminal device 120. For example, a set of predefined or configured uplink transmission resources in the time and frequency domain, a set of predefined or configured Modulation and Coding Schemes (MCS), the number of the plurality of transmissions may be configured from the network device 110 to the terminal device 120. The terminal device 120 may perform a plurality of uplink transmissions according to the configuration information. On the network side, the network device 110 may receive the uplink data from the terminal device according to the configuration information for the transmissions from the terminal device 120.

It can be found that the uplink grant is not required in the uplink transmission method described herein, and therefore the signaling overhead will be reduced between the terminal device 120 and the network device 110. Moreover, transmission latency will be lowered significantly between the terminal device 120 and the network device 110, leading to a high efficiency and low latency for the communication systems.

Figure 2:
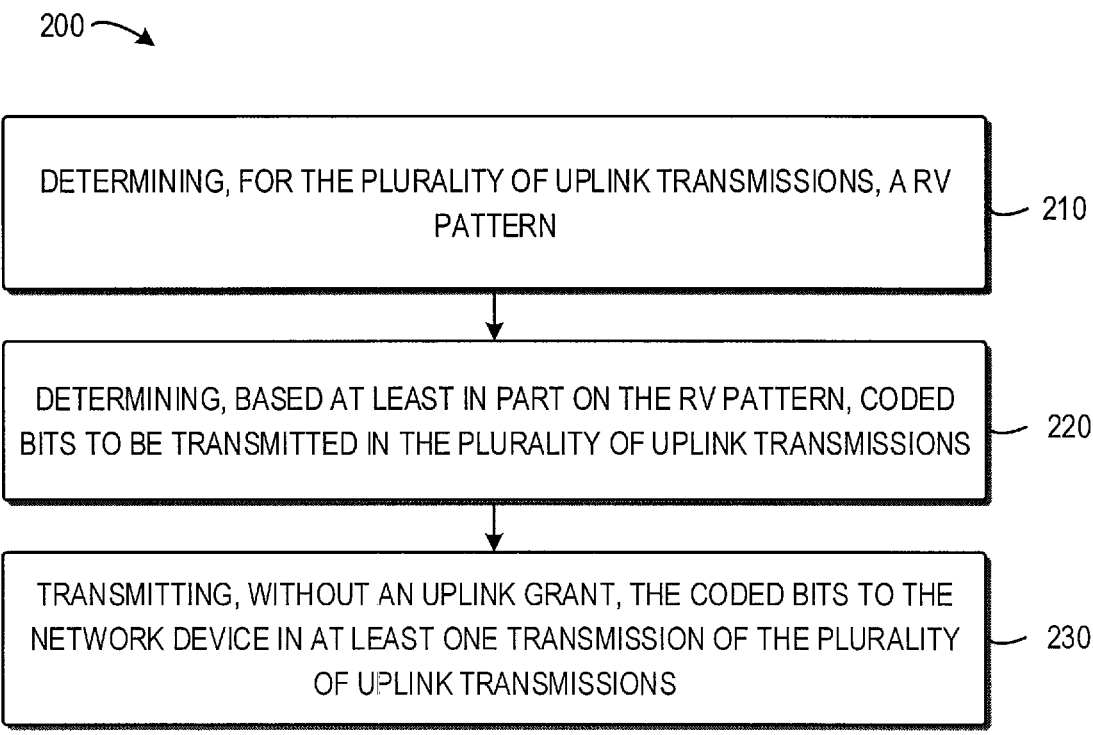
FIG. 2 shows a flowchart of a method 200 for uplink transmission without an uplink grant in the terminal device in accordance with some embodiments of the present disclosure.

Principle and implementations of the present disclosure will be described in more details below with reference to FIGS. 2-8. FIG. 2 shows a flowchart of a method 200 for uplink transmission without an uplink grant in the terminal device 120 in accordance with some embodiments of the present disclosure. The method 200 may be implemented in the terminal devices 120 for example. In the method 200, the terminal device 120 performs a plurality of uplink transmissions with a network device 110 without an uplink transmission.

Figure 3:
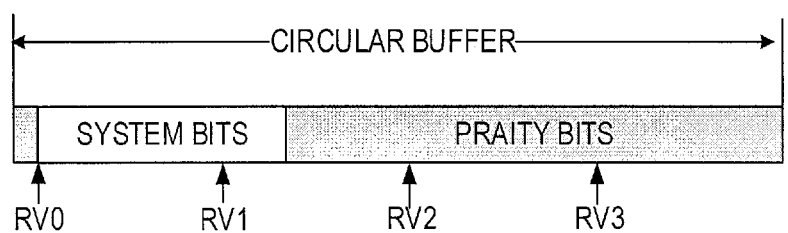
FIG. 3 shows a schematic diagram of RV indices.

In block 210, the terminal device 120 determines an RV pattern for the plurality of uplink transmissions. The RV pattern indicates a plurality of RV indices. The RV pattern also may represent a sequence of RV indices. In LTE and NR communication systems for example, there may be four RVs defined for the Turbo code and Low Density Parity Check Code (LDPC). That is, the corresponding RV indices may be RV0, RV1, RV2 or RV3, for example. The RV index indicates a starting position in a sequence of coded bits for the payload data to be transmitted to the network device 110. For example, as shown in FIG. 3, the code rate is 1/3, and the sequence of coded bits includes a portion of system bits and a portion of parity bits. In FIG. 3, there are four RV indices, indicated by RV0, RV1, RV2 or RV3 for example. It is shown that the RV0 indicates the starting position of the system bits to be transmitted. It should be noted that coded bits to be transmitted are also referred to the bits in the circular buffer. Therefore, the RV0 may also indicate the starting position of the first bit in the circular buffer. For a given duration of transmission and a given MCS, the terminal device 120 may determine a portion of coded bits in the circular buffer according to the RV index of this transmission. It should be mentioned that a portion of coded bits corresponding to some RV index may comprise the system bits and/or the parity bits in the coded bits.

In some embodiments of the disclosure, at least one RV index in the plurality of RV indices is periodic in the RV pattern. For example, there may be a plurality periodic RV0 in the RV pattern. It should be noted that, as shown in FIG. 3, the RV0 represents the beginning position of the sequence of the coded bits to be transmitted, which corresponds to the system bits. Therefore, the portion of coded bits corresponding to the RV0 is more likely to be self-decoded correctly compared with other RV indices for a given transmission duration. Therefore, the transmission corresponding to the RV0 may be also referred to as self-decodable transmission, which means that the success probability of decoding for such transmission with itself is higher than other transmissions corresponding to respective other RV indices than the RV0. Therefore, some predefined or configured RV indices, such as RV0, may be configured as periodic in the RV pattern.

To illustrate the periodic RV pattern herein, it is assumed that the number of the plurality of transmissions is K. If K is equal to 1, the terminal device may transmit the coded bits in the circular buffer with RV pattern of RV0. If K is equal to 2, the terminal device may transmit the coded bits in the circular buffer with RV pattern of RV0, and RV1. If K is equal to 3, the terminal device may transmit the coded bits in the circular buffer in RV index subsets of RV0, RV1, and RV0. If K is equal to 4, the terminal device may transmit the coded bits in the circular buffer with RV pattern of RV0, RV1, RV0, and RV2.

In this way, the important RV indices, such as RV0 or other predefined or configured RV index with self-decodable transmission may be configured as being periodic in the RV pattern. Thus, the network device 110 may have more chance to receive the transmission with these important RV index. As discussed above, these important RV indices may provide better performance itself or a combining gain than other less importance RV indices, which will lead to a higher success probability of the decoding in the uplink transmission by utilizing such periodic RV pattern. On the other hand, the network device 110 may also receive the predefined or configured self-decodable transmissions in an earlier time, which means the network device 110 may correctly receive the coded bits in an earlier time, thereby facilitating uplink transmission with a low latency and high performance.

In some embodiments of the disclosure, the RV pattern may be nested for different number of uplink transmissions. In one example, the RV pattern for K1 uplink transmissions is the starting part of the RV pattern for K2 uplink transmissions, given that K1 is smaller than K2. In another example, the RV pattern for K1 uplink transmissions is a part of RV pattern for K2 uplink transmissions, for K1 being less than K2. By utilizing this nested RV pattern, the design for the RV pattern may be efficient for different numbers of uplink transmissions without uplink grant. In one example, a well-designed RV pattern with a number of uplink transmissions may be easily extended to other RV patterns with a larger number of uplink transmissions, so that the grant-free transmission can work well for the other RV patterns, which may need more number of uplink transmissions. In another example, a long RV pattern with a number of uplink transmissions may be designed first, and other short RV patterns with different smaller numbers of uplink transmissions may be obtained by simply truncating the long RV pattern. Therefore, it is advantageous to realize a flexible and simple RV pattern design by employing this nested structure in the RV patterns.

In some embodiments of the disclosure, RV pattern may be determined based on some preconfigured information. For example, the preconfigured information may be the code rate of the coded bits to be transmitted. In this case, the RV pattern may be predefined or configured for each code rate between the terminal device 120 and the network device 110. When the network device 110 configures a code rate for the terminal device 120, the terminal device 120 may determine the corresponding RV pattern in an implicit way. In another example, the preconfigured information may be the MCS of the coded bits to be transmitted. In still another example, the RV pattern may be determined based on the number of the plurality of uplink transmissions. Moreover, the RV pattern may be determined based on a combination of the aforementioned preconfigured information. For instance, the RV pattern may be determined by the terminal device 120 based on a combination of the code rate and the number of the uplink transmissions. With the teaching and suggestions in the present disclosure, the skilled in the art may conceive the modification, change and/or variant of the example implementations, which may fall within the scope of the disclosure. It should be noted that by employing such implicit determination of the RV pattern from some predefined or configured information, the signaling for the RV pattern transmission between the terminal device 120 and the network device 110 may be saved.

In some embodiments of the disclosure, the RV pattern may be transmitted from the network device 110 in some signaling, which is desirable for the flexible implementation of the RV determination. For example, the RV pattern may be explicitly sent to the terminal device 120 in the DCI in PDCCH. For another example, the RV pattern may be conveyed in some high layer signaling, such as the Radio Resource Control (RRC) signaling, Media Access Control (MAC) Control Elements (CE) and/or system broadcasting information. It is advantageous for the network device 110 to dynamically configure a suitable RV pattern through some signaling for the terminal device 120 and/or other terminal devices.

Figure 4:
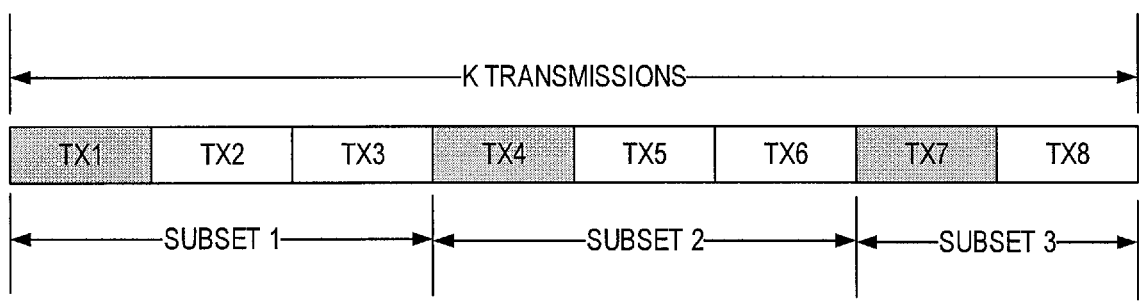
FIG. 4 shows a schematic diagram of a plurality of uplink transmissions according to embodiments of the present disclosure.

In some embodiments of the disclosure, the RV pattern may comprise a plurality of RV index subsets. Each RV index subset indicates a sequence of RV indices, which may comprise one or more RV indices from the plurality of RV indices in the RV pattern. The RV index subset may be also referred to as RV index set, RV index group, RV index portion, or RV index subgroup. The RV index subset may be explicit or implicit. As shown in FIG. 4 only for illustration, there are 8 uplink transmissions, and correspondingly 8 RV indices in the RV pattern. The 8 RV indices are divided into 3 RV index subsets. For instance, each of the first and second subset comprises 3 RV indices corresponding to 3 uplink transmissions, respectively. For another instance, the third subset comprises 2 RV indices corresponding to 2 uplink transmissions. Since the RV pattern is divided into multiple subsets, only less description for the subset is needed than the description of the whole RV pattern.

It should be mentioned that the RV index subset may be implemented in the RV pattern without a periodic structure as discussed above. It may be also desirable for the skilled in the art that the RV index subset may be combined with the periodic structure of the RV pattern as discussed above to implement a more flexible RV pattern implementation.

In some embodiments of the disclosure, the number of the RV index subsets may vary with different terminal devices and/or different types of service. The number of RV index subsets may also be configured by the network device in an implicit way according to other predefined or configured information or in an explicit way by using the signaling as discussed above. The size of a specific RV index subset may represent the number of RV indices in the RV index subset. For example, the sizes of the RV index subsets configured by the network device 110 may be different. In another example, the sizes of RV index subsets may be preconfigured by the network device 110. For still another example, the sizes of RV index subsets may be conveyed in signaling, such as DCI, MAC CE, RRC signaling, or System Information Blocks (SIB). In still another example, the sizes of RV index subsets may be also implicitly determined according to some predefined or preconfigured configuration information, such as the code rate of the coded bits to be transmitted, the MCS of the coded bits or the number of the plurality of transmissions.

For instance, the RV index subset may be determined according to the number of the plurality of transmissions. Without any loss of generality, it is assumed that the number of the plurality of transmissions is K. If K is equal to 1, the terminal device may transmit the coded bits in RV index subset of (RV0). If K is equal to 2, the terminal device may transmit the coded bits in RV index subset of (RV0, RV1). If K is equal to 3, the terminal device may transmit the coded bits in RV index subsets of (RV0, RV1) and (RV0). If K is equal to 4, the terminal device may transmit the coded bits in RV index subsets of (RV0, RV1) and (RV0, RV2).

It should be mentioned that all the specific numeral values are described for illustration purpose only, without limitations to the scope of the present disclosure. With the teaching and suggestions in the present disclosure, the skilled in the art may conceive any modification, change and/or variant of the example implementations, which fall within the scope of the disclosure.

In some embodiments of the disclosure, the RV index subset is nested with respect to the size of the RV index subset. In one example, for K1 being less than K2, the RV sequence for RV index subset with a size of K1 is the starting part of the RV sequence for RV index subset with a size of K2. In another example, the RV sequence for RV index subset with a size of K1 is a part of the RV sequence for RV index subset with a size of K2.

In some embodiments of the disclosure, the first or other predefined or configured RV index in the each subset may be a preconfigured RV index. In the discussion below, the first RV index in each subset will be discussed only for illustration, rather limitation purpose. For example, the preconfigured RV index may correspond to an uplink transmission with a higher probability of successful decoding compared with the uplink transmissions for other RVs. For instance, the preconfigured RV index in the first or some other RV index in each RV index subset may be the RV index corresponding to the self-decodable transmission. For another instance, the preconfigured RV index may be RV0, which corresponds to a self-decodable transmission with a higher probability of successful decoding. Through such configuration for each RV index subset, the network device 110 may obtain the self-decodable transmissions earlier and may have more chance to receive the self-decodable transmissions, which leads to a lower latency and a better receiving performance for the network device 110. It should be noted that the preconfigured RV index, such as RV0, may be also arranged in other RV index position in each subset than the first RV index, which will be determined according to the type of the service and/or different implementation requirements. The preconfigured RV index, such as RV0 may be also arranged in a different way for different RV index subsets, which may provide a more flexible implementation for the RV index subsets in the RV pattern. With the teaching and suggestions in the present disclosure, the skilled in the art may conceive the modification, change and/or variant of the example implementations, which may fall within the scope of the disclosure.

Through the utilization of RV index subsets, even when transmissions in previous one or several subsets may be missed by the network device 110, the self-decodable transmission with a better performance (i.e., starting from RV0) can be received by network device 110 in the following subsets. In some cases, network device 110 may detect at least one of the transmissions in previous subset although missed other transmissions (including the first transmission) in the subsets, then the network device 110 may combine the first transmission in this subset and the previous transmissions, so that a higher combing gain and thus a better communication performance can be achieved. It is desirable for the skilled in the art to implement different transmission and reception methods according to the teachings and suggestions in the present disclosure, which fall within the scope of the disclosure.

Alternatively or additionally, the first transmission corresponding to the first RV index in each RV index subset can also be another type of transmission with good decoding performance, e.g. not starting from RV0 but contains enough systematic bits so that the transmission may be self-decodable. The first transmission in each subset may also be starting from the first bit in the circular buffer as shown in FIG. 3.

Referring back to FIG. 2, in block 220, the terminal device 120 determines the coded bits to be transmitted in the plurality of uplink transmissions based at least in part on the RV pattern. In some embodiments of the disclosure, for each uplink transmission of the plurality of uplink transmissions, the terminal device 120 may determines a portion of the coded bits to be transmitted based on each RV index of the respective plurality of RV indices. Taking the first uplink transmission for example, in the first uplink transmission, the terminal device 120 may determine first RV index, such as RV0 or other RV indices according to the determined RV pattern in block 220. The terminal device may then determine the first portion of coded bits to be transmitted in the first uplink transmission according to the determined first RV index, the channel quality information and the MCS configured by the network device 110.

As discussed above, for a given sequence of coded bits in the circular buffer as shown in FIG. 3, each RV index is corresponding to a starting position of the coded bits to be transmitted in sequence of coded bits. Therefore, if the terminal device 120 knows the RV index in each uplink transmission, the terminal device 120 may determine the coded bits to be transmitted in each uplink transmission, based on the duration of each transmission, the MCS and the channel quality information in each uplink transmission for example.

In block 230, the terminal device 120 transmits the determined coded bits to the network device 110 without an uplink grant in at least one transmission of the plurality of uplink transmissions. In some embodiments of the disclosure, for each uplink transmission of the plurality of uplink transmissions, the terminal device 120 may transmit the determined portion of the coded bits to the network device 110 without an uplink grant. In some embodiments of the disclosure, the terminal device 120 may transmit the determined coded bits to the network device 110 without an uplink grant in all the predefined or configured plurality of uplink transmissions. In some embodiments of the disclosure, the terminal device 120 only transmits the determined coded bits to the network device 110 in a part of the plurality of uplink transmissions, and the terminal device 120 may receive an indication from the network device 110 indicating that the network device 110 has successfully received the data from only a portion of the coded bits in the part of the plurality uplink transmissions. In this case, the terminal device 120 will not continue to perform the remaining uplink transmissions to the network device 110 for the remaining uplink transmissions in the plurality of uplink transmission.

Figure 5:
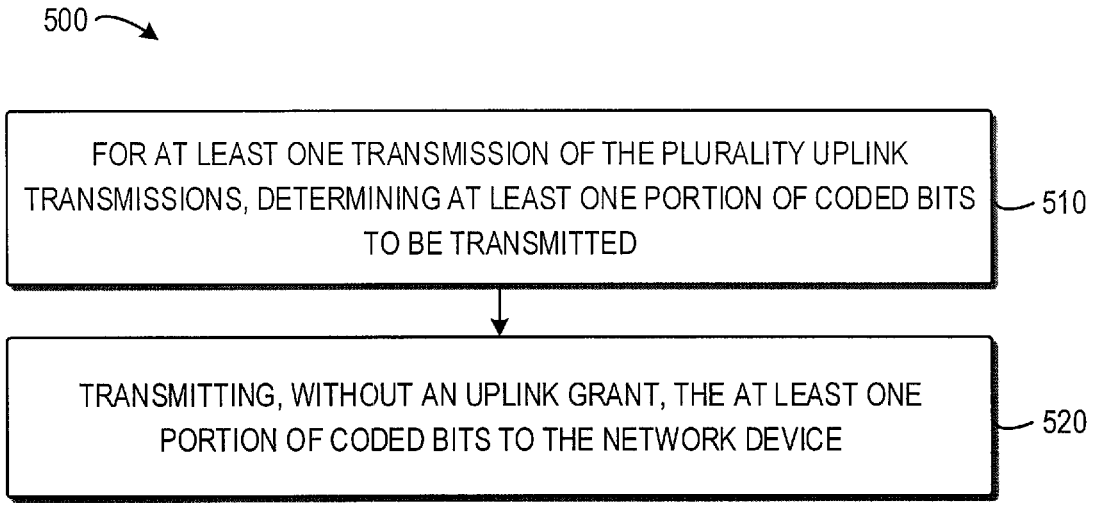
FIG. 5 shows a flowchart of a method 500 for sequential uplink transmission without an uplink grant in the terminal device in accordance with some embodiments of the present disclosure.

FIG. 5 shows a flowchart of a method 500 for sequential uplink transmission without an uplink grant in the terminal device in accordance with some embodiments of the present disclosure. The method 500 may be implemented in the terminal device 120. The terminal device 120 performs a plurality of uplink transmissions without an uplink grant with the network device 110. In the method 500, the terminal device 120 performs a sequential transmission to the network device 110 without an uplink grant. The principle and process of the sequential uplink transmission is detailed as follows.

Figure 6:
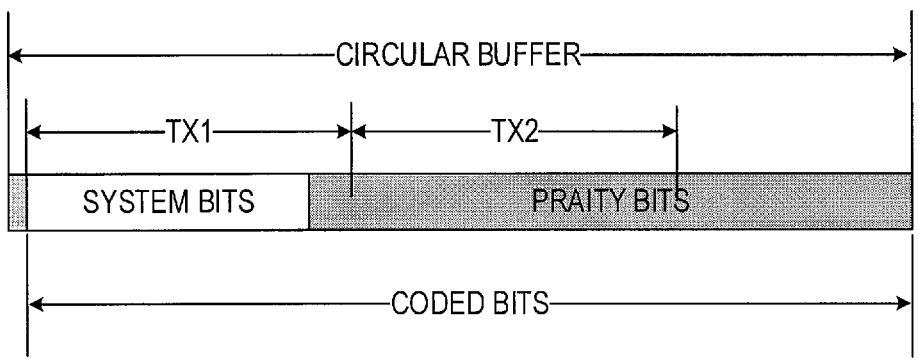
FIG. 6 shows a schematic diagram of sequential uplink transmission according to embodiments of the present disclosure.

In block 510, the terminal device 120 determines at least one portion of coded bits to be transmitted in the at least one transmission for at least one transmission of the plurality uplink transmissions. It should be noted that although the network device 110 may configure the plurality of uplink transmission for the terminal device 120. The terminal device may use only a part of the plurality of uplink transmissions. For example, the terminal device 120 may receive an indication from the network device 110 indicating that the network device has decoded the coded bits successfully. Therefore, the remaining uplink transmissions other than the part of the plurality of uplink transmissions will not be used by the terminal device 120. In some embodiments of the disclosure, as shown in FIG. 6, the at least one portion of coded bits for the at least one of transmission may start from the beginning position of the coded bits to be transmitted. Alternatively or additionally, the starting position of the uplink transmission in the sequence of the coded bits to be transmitted may be also predefined or configured as other position for the terminal device 120.

In the sequential transmission method 500, the portion of coded bits to be transmitted for each of the at least one transmission starts immediately after an ending position of a previous portion of coded bits to be transmitted in a previous transmission with respect to the each of the at least one transmission. That is, in the sequential transmission, the portion of codes bit in the current uplink transmission is continuous with the previous portion of coded bits in the previous one uplink transmission with respect to the sequence of coded bits in the circular buffer. For instance, the portion of coded bits for the (i+1)th uplink transmission starts immediately from the ending position of portion of the coded bits for the ith uplink transmission. As shown in FIG. 6 only for illustration purpose, the portion of coded bits in second uplink transmission starts immediately from the ending of the portion of coded bit in the first uplink transmission. In some embodiments of the sequential uplink transmission, the portion of coded bits for the current uplink transmission may start from the ending position of the portion of coded bits for any of previous uplink transmissions, which can be configured or predefined by the network device 110 according to different system implementations and requirements.

In the uplink transmission without an uplink grant, the MCS and transmission resource have been known by terminal device 120 and network device 110, as the MCS and transmission resource may be preconfigured by the network device to terminal device 120. Therefore, for each uplink transmission in the at least one uplink transmissions as discussed above, the total number of coded bits is also known by both terminal device 120 and network device 110. Therefore, terminal device 120 and network device 110 may know exactly the coded bits to be transmitted in each uplink transmission based on the transmission duration, MCS and transmission resource configurations.

Referring back to FIG. 5, in block 520, the terminal device 120 transmits at least one portion of coded bits to the network device without an uplink grant in a sequential transmission in the at least one transmission as discussed in block 510. In this case, the sequential transmission may start from some fixed positions, and the network device 110 needs to detect all the possible positions for each transmission, similarly as the network device 110 needs to detect all the possible positions in the uplink transmission by using the RV patterns as discussed above. After the network device 110 detects at least one uplink continuous sequential transmission, i.e., the transmission is just sequential transmission of the previous one transmission, less processing is needed for network device 110 to collect the received coded bits.

In some embodiments of the disclosure, the sequential transmission method in FIG. 5 may be implemented together with the RV pattern having one or more periodic RV indices in the uplink transmission without an uplink grant. For example, the periodic RV index positions in the RV pattern may be followed by a sequential transmission as discussed in connection with FIG. 5. For example, some uplink transmissions in the plurality of uplink transmissions may be determined according to the RV pattern as discussed in FIG. 2, and other uplink transmissions may be performed on the sequential transmission. For another example, the sequential transmission may be also implemented in some of the RV index subsets in an RV pattern. That is, in some RV index subset, a part of the uplink transmissions are performed based on the RV index indicted by the RV index subset, and other parts of the uplink transmission are based on the sequential transmission with a predefined or configured starting position of the coded bit sequence. According to the teaching and guidance in the present disclosure, the skilled in the art may conceive the modification, combination and/or variant of the example implementations, according to different application scenarios and system requirements, which fall within the scope of the disclosure.

Figure 7:
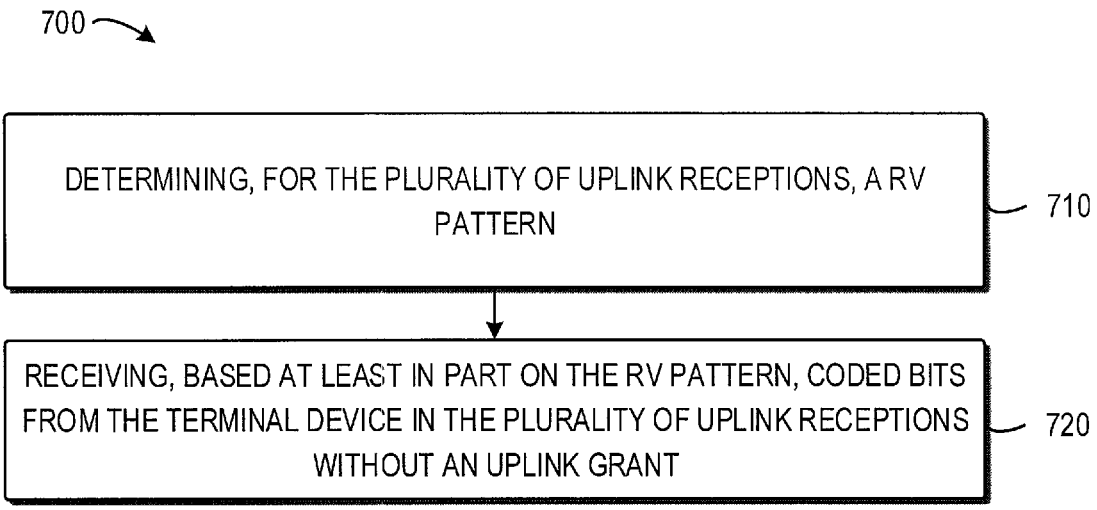
FIG. 7 shows a flowchart of a method 700 for uplink reception without an uplink grant in the network device in accordance with some embodiments of the present disclosure.

FIG. 7 shows a flowchart of a method 700 for uplink reception without an uplink grant in the network device in accordance with some embodiments of the present disclosure. The method 700 may be performed in the network device 110. In this method, the network device 110 performs a plurality of uplink receptions from a terminal device 120.

In block 710, the network device 110 determines for the plurality of uplink receptions, an RV pattern. The RV pattern indicates a sequence of RV indices, which may comprise a plurality of RV indices as discussed in FIG. 2.

In some embodiments of the disclosure, at least one RV index in the plurality of RV indices is periodic in the RV pattern. The RV patterns may be nested with respect to different numbers of the plurality of uplink transmissions. The details of the RV pattern and the nested structure of the RV pattern can be found in the description in connection with the FIGS. 2-4 as discussed above.

In some embodiments of the disclosure, the RV pattern may comprise a plurality of RV index subsets. Each RV index subset indicates one or more RV indices. In one example, the first RV index in the each subset may be a preconfigured RV index. The number of the RV pattern may be different for different terminal devices and/or different traffic services. The sizes of the RV index subsets may be different for different RV index subsets. In another example, RV index subsets may be nested with respect to the sizes of the RV index subsets. The details of the RV index subset can be also found in the description of FIGS. 2-4.

In some embodiments of the disclosure, the network device 110 may transmit the determined RV pattern to the terminal device 120 by some signaling. Alternatively or additionally, the network device may also transmit the determined RV subsets to the terminal device 120.

In some embodiments of the disclosure, the network device 110 may also transmit to the terminal device 120 the number of the plurality of uplink transmissions. The number of number of the plurality of uplink transmissions may be used to implicitly indicate the RV pattern used in the terminal device 120 and the network device 110. Alternatively or additionally, the network device 110 may transmit to the terminal device 120 the uplink transmission resource of the plurality of uplink transmission. Alternatively or additionally, the network device 110 may also transmit a specific MCS or a set of MCS to the terminal device 120.

In block 720, the network device 110 receives coded bits from the terminal device based at least in part on the RV pattern in at least one reception without an uplink grant. In some embodiments of the disclosure, for each uplink reception of the plurality of uplink receptions, the network device 110 receives a portion of the coded bits from the terminal device without an uplink grant. As discussed in FIG. 2, the portion of the coded bits for each uplink reception of the plurality of uplink receptions may be determined based on respective each RV index of the respective plurality of RV indices of the RV pattern. It should be also noted that the network device 110 may not perform all the uplink receptions in the plurality of uplink receptions, as the network device 110 may decode the coded bits successfully by exploiting a part of the uplink receptions in an earlier time.

In some embodiments of the disclosure, the network device 110 may determine whether there is some data transmitted from the terminal device 120 by exploiting some transmission characteristics of the terminal device 120. The transmission characteristic of terminal device 120 may be, for example, the prior knowledge of the transmission behavior from the terminal device 120 and/or the predefined or preconfigured configuration information for the uplink transmission from the terminal device 120. If the network device 110 determines that there is some data transmitted from the terminal device 120, the network device may then perform uplink receptions from the terminal device 120.

Figure 8:
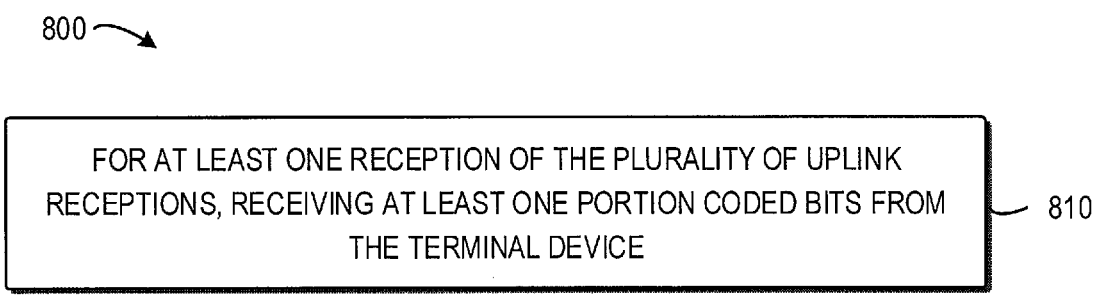
FIG. 8 shows a flowchart of a method 800 for sequential uplink reception in the network device in accordance with some embodiments of the present disclosure.

FIG. 8 shows a flowchart of a method 800 for sequential uplink reception in the network device in accordance with some embodiments of the present disclosure. The method 800 may be performed in the network device 110. In this method, the network device 110 performs a plurality of uplink receptions from a terminal device 120.

In block 810, for at least one reception, the network device 110 receives at least one portion coded bits from the terminal device 120 in respective at least one transmission without an uplink grant. The portion of coded bits in each of at least one transmission starts immediately after an ending position of a previous portion of coded bits in a previous transmission with respect to the each of the least one transmission. Details of the sequential transmission can be found in the description of FIG. 5 and FIG. 6.

Figure 9:
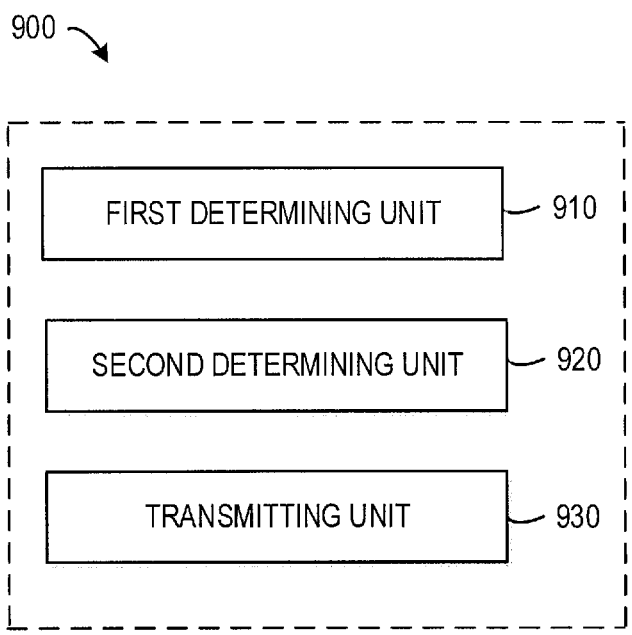
FIG. 9 shows a block diagram of an apparatus 900 in accordance with some embodiments of the present disclosure.

Now reference is made to FIG. 9, which shows a block diagram of an apparatus 900 in accordance with some embodiments of the present disclosure. It should be noted that the apparatus 900 may be implemented at the terminal device 120.

As shown in FIG. 9 the apparatus 900 comprise a first determining unit 910, a second determining unit 920, and a transmitting unit 930. The first determining unit 910 is configured to determine, for the plurality of uplink transmissions, an RV pattern. The RV pattern indicates a respective plurality of RV indices. The second determining unit 920 is configured to determine, based at least in part on the RV pattern, coded bits to be transmitted in the plurality of uplink transmissions. The transmitting unit 930 is configured to transmit the coded bits to the network device without an uplink grant in at least one transmission of the plurality of uplink transmissions.

In some embodiments, at least one RV index in the respective plurality of RV indices may be periodic in the RV pattern. The RV pattern may be also nested with respect to a number of the plurality of uplink transmissions.

In some embodiments, the RV pattern may comprise a plurality of RV index subsets. Each RV index subset indicates one or more RV indices, and a first RV index in the each subset is a preconfigured RV index, such as RV 0 for example. In one example, the number of the RV index subsets may be different for different terminal devices or different services for example. In another example, the sizes of the RV index subsets may be also different for different subsets. In still another example, the plurality of RV index subsets may be nested with respect to a size of the plurality of RV index subsets. Details of the RV pattern and RV index subset can be found in the description of FIG. 2.

In some embodiments, the first determining unit 910 may be further configured to determine the RV pattern based on a code rate of the coded bits to be transmitted, a MCS of the coded bits to be transmitted, and/or a number of the plurality of uplink transmissions. Details of the RV pattern and RV index subset determination in either an implicit or an explicit way can be found in the description of FIG. 2.

Figure 10:
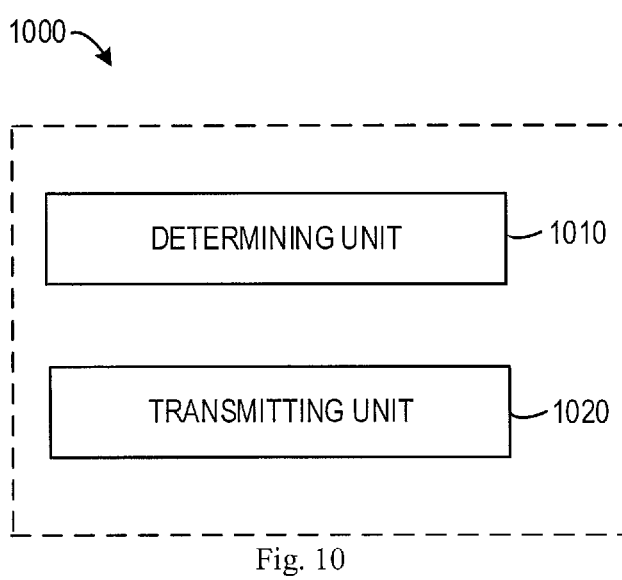
FIG. 10 shows a block diagram of an apparatus 1000 in accordance with some embodiments of the present disclosure.

FIG. 10 shows a block diagram of an apparatus 1000 in accordance with some embodiments of the present disclosure. It should be noted that the apparatus 1000 may be implemented at the terminal device 120.

As shown in FIG. 10, the apparatus 1000 comprises a determining unit 1010 and a transmitting unit 1020. The determining unit 1010 is configured to determine at least one portion of coded bits to be transmitted in the at least one transmission for at least one transmission of the plurality uplink transmissions. The transmitting unit 1020 is configured to transmit the at least one portion of coded bits to the network device without an uplink grant. The portion of coded bits to be transmitted for each of the at least one transmission starts immediately after an ending position of a previous portion of coded bits to be transmitted in a previous transmission with respect to the each of the at least one transmission. In some embodiments, at least one portion of coded bits to be transmitted for at least one of transmission of the plurality of uplink transmission starts from a predefined or configured position, such as the beginning position of the coded bits to be transmitted. Details of the sequential uplink transmission can be found in description of FIG. 5.

Figure 11:
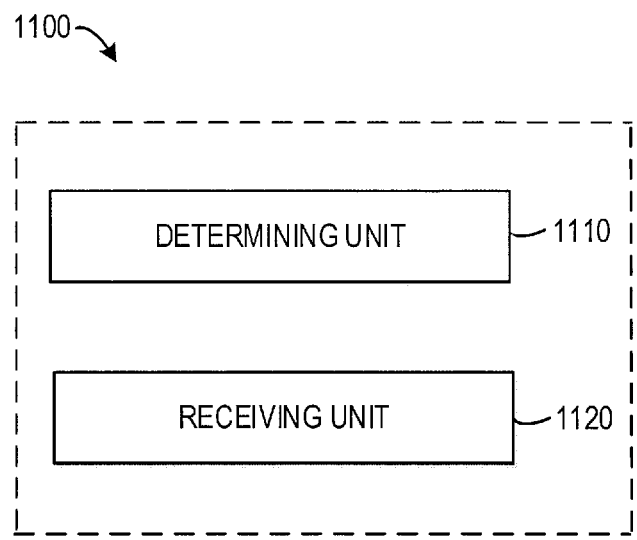
FIG. 11 shows a block diagram of an apparatus 1100 in accordance with some embodiments of the present disclosure.

FIG. 11 shows a block diagram of an apparatus 1100 in accordance with some embodiments of the present disclosure. The apparatus 1100 may be implemented in the network device 110 for example.

A shown in FIG. 11, the apparatus 1100 comprises a determining unit 1110 and a receiving unit 1120. The determining unit 1110 is configured to determine for the plurality of uplink receptions, an RV pattern. The RV pattern indicates a plurality of RV indices. The receiving unit 1120 is configured to receive coded bits from the terminal device in at least one reception of the plurality of uplink receptions based at least in part on the RV pattern without an uplink grant.

In some embodiments of the disclosure, at least one RV index in the plurality of RV indices is periodic in the RV pattern. The RV pattern may be nested with respect to a number of the plurality of uplink transmissions. The details of the RV pattern can be found in the description of FIGS. 2-4 as discussed above.

The RV pattern may comprise a plurality of RV index subsets. Each RV index subset indicates one or more RV indices. For example, the first RV index in the each subset may be a preconfigured RV index. The sizes of the RV index subsets may be different. For another example, the plurality of RV index subsets may be nested with respect to a size of the plurality of RV index subsets. The details of the RV index subset can be found in the description of FIGS. 2-4 as discussed above.

In some embodiments of the disclosure, the apparatus 1100 may further comprise a unit configured to transmit the determined RV pattern to the terminal device 120.

In some embodiments of the disclosure, the apparatus 1100 may further comprise a unit configured to transmit to the terminal device 120 the number of the plurality of uplink transmissions. The number of number of the plurality of uplink transmissions may be used to implicitly indicate the RV pattern used in the terminal device 120 and the network device 110. Alternatively or additionally, the apparatus 1100 may further comprise a unit configured to transmit to the terminal device 120 the uplink transmission resource of the plurality of uplink transmission. Alternatively or additionally, the apparatus 1100 may comprise a unit configured to transmit a specific MCS or a set of MCS to the terminal device 120.

In some embodiments of the disclosure, the apparatus 1100 may further comprise a unit configured to receive a portion of the coded bits from the terminal device without an uplink grant, for each uplink reception of the plurality of uplink receptions. As discussed in FIG. 2, the portion of the coded bits for each uplink reception of the plurality of uplink receptions may be determined based on respective each RV index of the respective plurality of RV indices of the RV pattern.

Figure 12:
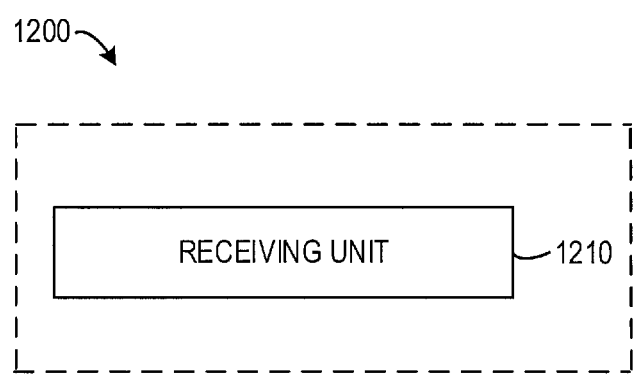
FIG. 12 shows a block diagram of an apparatus 1200 in accordance with some embodiments of the present disclosure.

FIG. 12 shows a block diagram of an apparatus 1200 in accordance with some embodiments of the present disclosure. The apparatus 1200 may be implemented in the network device 110 for example. As shown in FIG. 12, the apparatus 1200 comprises a receiving unit 1210.

The receiving unit 1210 is configured to for at least one reception of the plurality of uplink receptions, receive at least one portion coded bits in respective at least one transmission without an uplink grant. The portion of coded bits in each of at least one transmission may start immediately after an ending position of a previous portion of coded bits in a previous transmission with respect to the each of the least one transmission. Details of the sequential uplink transmission can be found in the description in FIG. 5 and FIG. 6.

It is also to be noted that the apparatus 900, 1000, 1100, and 1200 may be respectively implemented by any suitable technique either known at present or developed in the future. Further, a single device shown may be alternatively implemented in multiple devices separately, and multiple separated devices may be implemented in a single device. The scope of the present disclosure is not limited in these regards.

It is noted that the apparatus 900, 1000, 1100 and 1200 may be configured to implement functionalities as described with reference to FIGS. 2, 5, 7 and 8, respectively. Therefore, the features discussed with respect to the methods 200, 500, 700 and 800 may apply to corresponding components of the apparatus 900, 1000, 1100 and 1200 respectively, and the features discussed with respect to the methods 200, 500, 700 and 800 may apply to corresponding components of the apparatus 900, 1000, 1100 and 1200, respectively.

It is further noted that the components of the apparatus 900, 1000, 1100 and 1200 may be embodied in hardware, software, firmware, and/or any combination thereof. For example, the components of the apparatus 900, 1000, 1100 and 1200 may be respectively implemented in a circuit, a processor or any other appropriate device. Those skilled in the art will appreciate that the aforesaid examples are only for illustration not limitation.

In some embodiment of the present disclosure, the apparatus 900, 1000, 1100 and 1200 may comprise at least one processor respectively. The at least one processor suitable for use with embodiments of the present disclosure may include, by way of example, both general and special purpose processors already known or developed in the future. The apparatus 900, 1000, 1100 and 1200 may further comprise at least one memory. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compliable or interpretable programming languages. In accordance with embodiments, the computer executable instructions may be configured, with the at least one processor, to cause the apparatus 900, 1000, 1100 and 1200 to at least perform according to the methods 200, 500, 700 and 800 respectively as discussed above.

Based on the above description, the skilled in the art would appreciate that the present disclosure may be embodied in an apparatus, a method, or a computer program product. In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the embodiments of this disclosure may be illustrated and described as block diagrams, flowcharts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The various blocks shown in FIGS. 9, 10, 11 and 12 respectively may be viewed as method steps, and/or as operations that result from operation of computer program code, and/or as a plurality of coupled logic circuit elements constructed to carry out the associated function(s). At least some aspects of the embodiments of the disclosures may be practiced in various components such as integrated circuit chips and modules, and that the embodiments of this disclosure may be realized in an apparatus that is embodied as an integrated circuit, FPGA or ASIC that is configurable to operate in accordance with the embodiments of the present disclosure.

Figure 13:
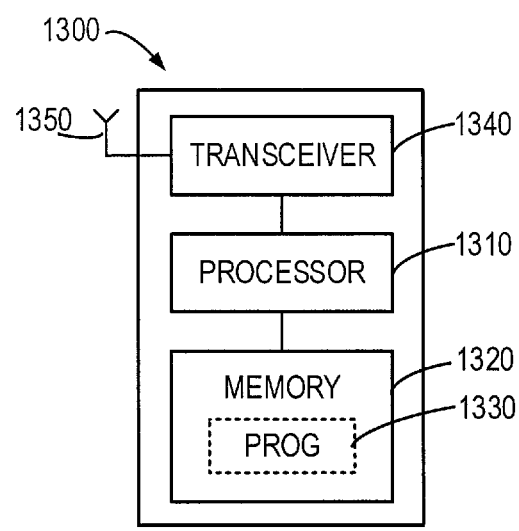
FIG. 13 is a simplified block diagram of a communication device 1300 that is suitable for implementing embodiments of the present disclosure.

FIG. 13 is a simplified block diagram of a communication device 1300 that is suitable for implementing embodiments of the present disclosure. As shown, the communication device 1300 includes one or more processors 1310, one or more memories 1320 coupled to the processor(s) 1310, one or more transmitters and/or receivers (TX/RX) 1340 coupled to the processor 1310.

The processor 1310 may be of any type suitable to the local technical network, and may include one or more of general purpose computers, special purpose computers, microprocessors, digital signal processors (DSPs) and processors based on multicore processor architecture, as non-limiting examples. The communication device 1300 may have multiple processors, such as an application specific integrated circuit chip that is slaved in time to a clock which synchronizes the main processor.

The memory 1320 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples.

The memory 1320 stores at least a part of a program 1330. The TX/RX 1340 is for bidirectional communications. The TX/RX 1340 has at least one antenna to facilitate communication, though in practice a terminal device 120 or a network device 110 mentioned in this disclosure may have several ones. The communication interface may represent any interface that is necessary for communication with other network elements.

The program 1330 is assumed to include program instructions that, when executed by the associated processor 1310, enable the communication device 1300 to operate in accordance with the embodiments of the present disclosure, as discussed herein with reference to FIGS. 2, 5, 7 and 8, respectively. That is, embodiments of the present disclosure can be implemented by computer software executable by the processor 1310 of the communication device 1300, or by hardware, or by a combination of software and hardware.

While this specification contains many specific implementation details, these should not be construed as limitations on the scope of any disclosure or of what may be claimed, but rather as descriptions of features that may be specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Various modifications, adaptations to the foregoing embodiments of this disclosure may become apparent to those skilled in the relevant arts in view of the foregoing description, when read in conjunction with the accompanying drawings. Any and all modifications will still fall within the scope of the non-limiting and embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purpose of limitation.

What is claimed is:

1. A method implemented in a terminal device in a communication system, the terminal device performing a plurality of uplink transmissions with a network device, comprising:
    determining, for the plurality of uplink transmissions, a redundancy version pattern, wherein the redundancy version pattern comprises a plurality of redundancy version index subsets, each redundancy version index subset indicating one or more redundancy version indices, and wherein the redundancy version index subset is a redundancy version index subgroup;
    determining, based at least in part on the redundancy version pattern, coded bits to be transmitted in the plurality of uplink transmissions; and
    transmitting, without an uplink grant, the coded bits to the network device in at least one transmission of the plurality of uplink transmissions.

2. The method according to claim 1, wherein the determining the redundancy version pattern comprises determining the redundancy version pattern based on at least one of:
    a code rate of the coded bits to be transmitted,
    a modulation and coding scheme of the coded bits to be transmitted, and
    a number of the plurality of uplink transmissions.

3. The method according to claim 1, wherein the redundancy version pattern is nested with respect to a number of the plurality of uplink transmissions.

4. The method according to claim 1, wherein a first redundancy version index in the each subset is a preconfigured redundancy version index.

5. The method according to claim 4, wherein the preconfigured redundancy version index refers to redundancy version zero.

6. The method according to claim 1, wherein sizes of the redundancy version index subsets are different.

7. The method according to claim 1, wherein the plurality of redundancy version index subsets is nested with respect to a size of the plurality of redundancy version index subsets.

8. A terminal device, comprising:
    a processor; and
    a memory coupled to the processor and storing instructions thereon, the instructions, when executed by the processor, causing the terminal device to perform actions, the actions comprising:
    determining, for a plurality of uplink transmissions, a redundancy version pattern, wherein the redundancy version pattern comprises a plurality of redundancy version index subsets, each redundancy version index subset indicating one or more redundancy version indices, and wherein the redundancy version index subset is a redundancy version index subgroup;
    determining, based at least in part on the redundancy version pattern, coded bits to be transmitted in the plurality of uplink transmissions; and
    transmitting, without an uplink grant, the coded bits to the network device in at least one transmission of the plurality of uplink transmissions.

9. The terminal device according to claim 8, wherein the determining the redundancy version pattern comprises determining the redundancy version pattern based on at least one of:
    a code rate of the coded bits to be transmitted, a modulation and coding scheme of the coded bits to be transmitted, and a number of the plurality of uplink transmissions.

10. The terminal device according to claim 8, wherein the redundancy version pattern is nested with respect to a number of the plurality of uplink transmissions.

11. The terminal device according to claim 8, wherein a first redundancy version index in the each subset is a preconfigured redundancy version index.

12. The terminal device according to claim 11, wherein the preconfigured redundancy version index refers to redundancy version zero.

13. The terminal device according to claim 8, wherein sizes of the redundancy version index subsets are different.

14. A network device, comprising:

a processor; and a memory coupled to the processor and storing instructions thereon, the instructions, when executed by the processor, causing the network device to perform actions, the actions comprising:

determining, for a plurality of uplink transmissions, a redundancy version pattern, wherein the redundancy version pattern comprises a plurality of redundancy version index subsets, each redundancy version index subset indicating one or more redundancy version indices, and wherein the redundancy version index subset is a redundancy version index subgroup; and receiving, based at least in part on the redundancy version pattern, coded bits from a terminal device in at least one reception of the plurality of uplink transmissions without an uplink grant.

15. The network device according to claim 14, wherein the actions further comprises:

transmitting the redundancy version pattern to the terminal device.

16. The network device according to claim 14, wherein the determining the redundancy version pattern comprises determining the redundancy version pattern based on at least one of:

a code rate of the coded bits to be transmitted, a modulation and coding scheme of the coded bits to be transmitted, and a number of the plurality of uplink transmissions.

17. The network device according to claim 14, wherein the actions further comprises transmitting to the terminal device at least one of;

the number of the plurality of uplink transmissions, transmission resource of the plurality of uplink transmission, and a set of modulation and coding scheme.

18. The network device according to claim 14, wherein the redundancy version pattern is nested with respect to a number of the plurality of uplink transmissions.

19. The network device according to claim 14, wherein a first redundancy version index in the each subset is a preconfigured redundancy version index.

20. The network device according to claim 19, wherein the preconfigured redundancy version index refers to redundancy version zero.

* * * * *